(No Model.)
T. DOOLAN.
FEED TROUGH.
No. 487,003. Patented Nov. 29, 1892.
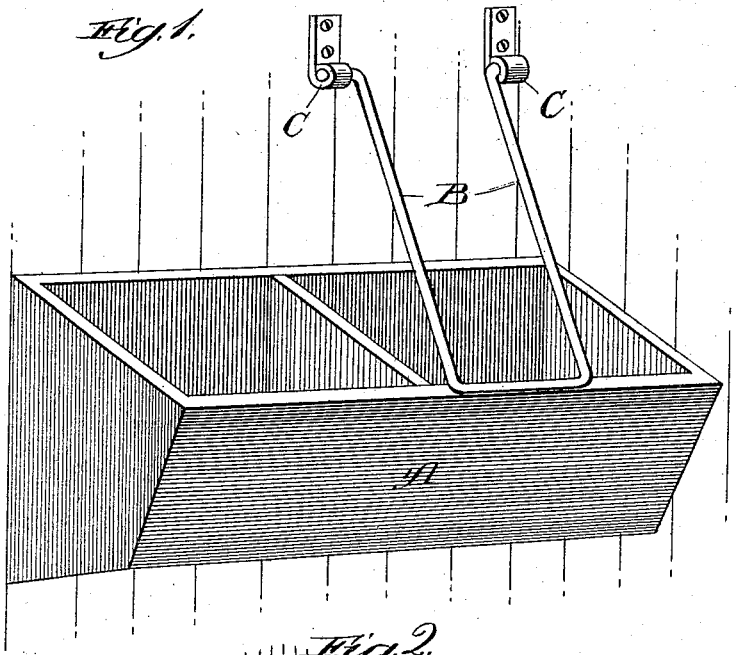
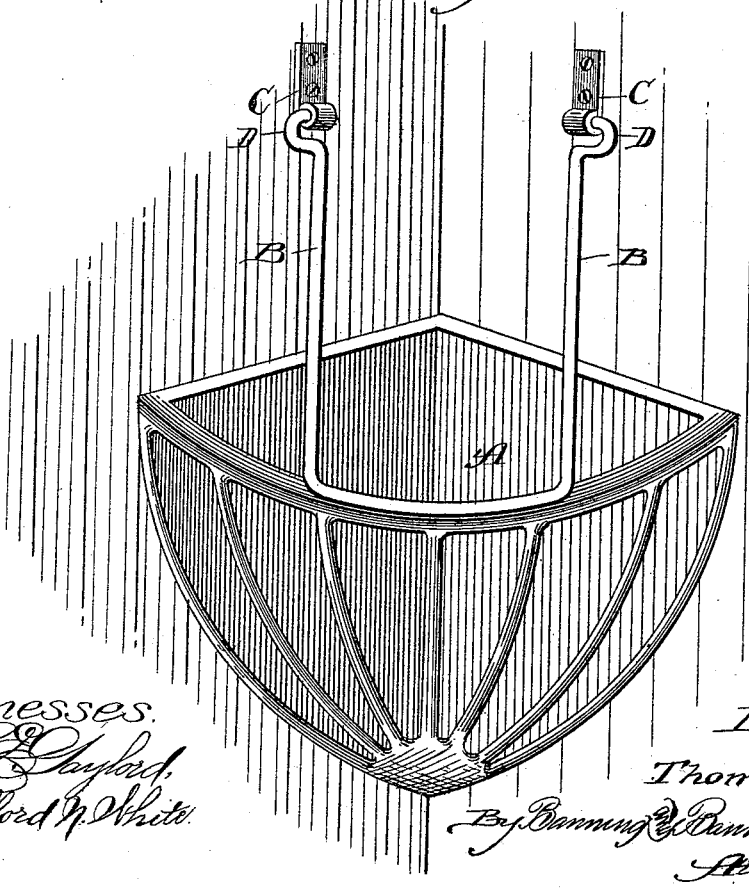
Witnesses:
Inventor:
Thomas Doolan,
By Banning & Banning & Payson,
Attys.

UNITED STATES PATENT OFFICE.

THOMAS DOOLAN, OF CHICAGO, ILLINOIS.

FEED-TROUGH.

SPECIFICATION forming part of Letters Patent No. 487,003, dated November 29, 1892.

Application filed August 15, 1890. Serial No. 362,107. (No model.)

*To all whom it may concern:*

Be it known that I, THOMAS DOOLAN, of Chicago, Cook county, Illinois, have invented a new and useful Improvement in Hay-Savers, of which the following is a specification.

My invention relates to improvements in that class of devices for preventing the waste of material from mangers or troughs for feeding horses or other cattle in which the waste is prevented by means of an open rack or frame extending, substantially, across the top of the manger.

Heretofore it has been the practice to employ pivoted racks, designed to rest upon the hay or upon the top of the manger substantially horizontal, the hay being pulled through between the bars of the rack by the horse, and then there is nothing to hinder the animal from scattering the hay all over the stall.

My hay-saver is arranged in an inclined position relatively to the manger, is not designed to touch the hay unless the space behind the saver be filled up, and the inclined parallel portions are of such a distance apart as to permit a horse's head between them, so that while getting at and eating the hay his head is between the said parallel portions and prevented thereby from lateral movement, so that he cannot scatter the hay while eating. In this resides the gist of my invention.

In the accompanying drawings, Figure 1 represents a perspective view of my improved arrangement of parts, and Fig. 2 illustrates the form of the saver-frame intended to be used in connection with a corner manger.

Referring to the drawings, A is the manger; B, the saver-frame, constructed, preferably, of a single piece of metal rod formed into a three-sided rectangular frame with its ends bent outwardly to form the pintles of a hinge, and C C the hinge butts or eyes to receive the pintles of the saver-frame and adapted to be secured to the wall of a stall.

Instead of attaching the frame to the edge of the manger or on a line therewith I hinge it to the wall against which the manger is placed at a point considerably above the top edge of the manger, so that a large angular space between the wall and the frame is left to be occupied by hay. It will thus be readily seen that by providing this additional space I am enabled greatly to reduce the size of the manger without decreasing its hay-holding capacity. The free end of the frame is made to rest upon the front edge of the manger, and is thereby prevented from pressing down upon the hay and obviating the jerking and pulling at the hay necessary to extract it when the frame or rack is allowed to swing down into and press upon the material within the manger.

In Fig. 2 I have shown the construction of the frame or saver intended to be used in connection with a corner manger. It will be noticed that in this form the side bars of the frame are provided with an outward semi-circular bend D at their hinge ends. This bend, as will readily be understood, imparts a degree of flexibility and elasticity to the frame at that point sufficient to permit it to be raised with only a slight resistance, which would be considerable without the bend when the hinge-eyes are placed upon walls at an angle to each other, owing to the tendency of the pintles to bind in their bearings. In providing the side bars with this bend a specially-constructed form of butts to receive the pintles in the same line when placed upon the walls of a corner will be unnecessary, thus economizing in the cost of this form of the device.

It is deemed important that the hay-saver be hinged above the manger instead of below the same, so that if the animal should pull the same away from the wall in withdrawing his head it will automatically fall back to its normal position. Importance is also attached to the fact that it is made of a single piece of round spring material, with its ends bent to form pintles, whereby it has freer movement, is cheaper, will yield to slight movement or pressure, and can be readily inserted or removed from its bearings.

What I claim is—

1. The combination, with a manger, of a three-sided hay-saver constructed from a single piece of spring material formed with its ends bent to constitute pintles, and the parallel side portions, said portions being disconnected, so that their pintle ends may be moved to and from each other, and the said portions also being a sufficient distance apart to permit the horse's head between them, but not to allow its lateral movement therein, the saver being removably hinged at a considerable distance above the top of the manger and arranged to lie at an angle thereto with its front portion supported by the front edge of the manger, substantially as shown and described.

2. The combination, with a manger, of a three-sided hay-saver constructed from a single piece of spring material and formed with its ends bent to constitute pintles by which the saver is hinged with the outward semicircular bends near each end, the parallel side portions, and the cross-bar at the lower end, the saver being hinged at a considerable distance above the manger and arranged to lie at an angle to the top of the manger with the cross-bar resting on the front edge of the manger, substantially as shown and described.

THOMAS DOOLAN.

Witnesses:
   THOMAS A. BANNING,
   SAMUEL E. HIBBEN.